Feb. 6, 1951 G. F. STAHMER, II, ET AL 2,541,008
AGITATING AND DISCHARGING DISK STRUCTURE
FOR FERTILIZER SPREADERS
Filed June 8, 1946 2 Sheets-Sheet 1
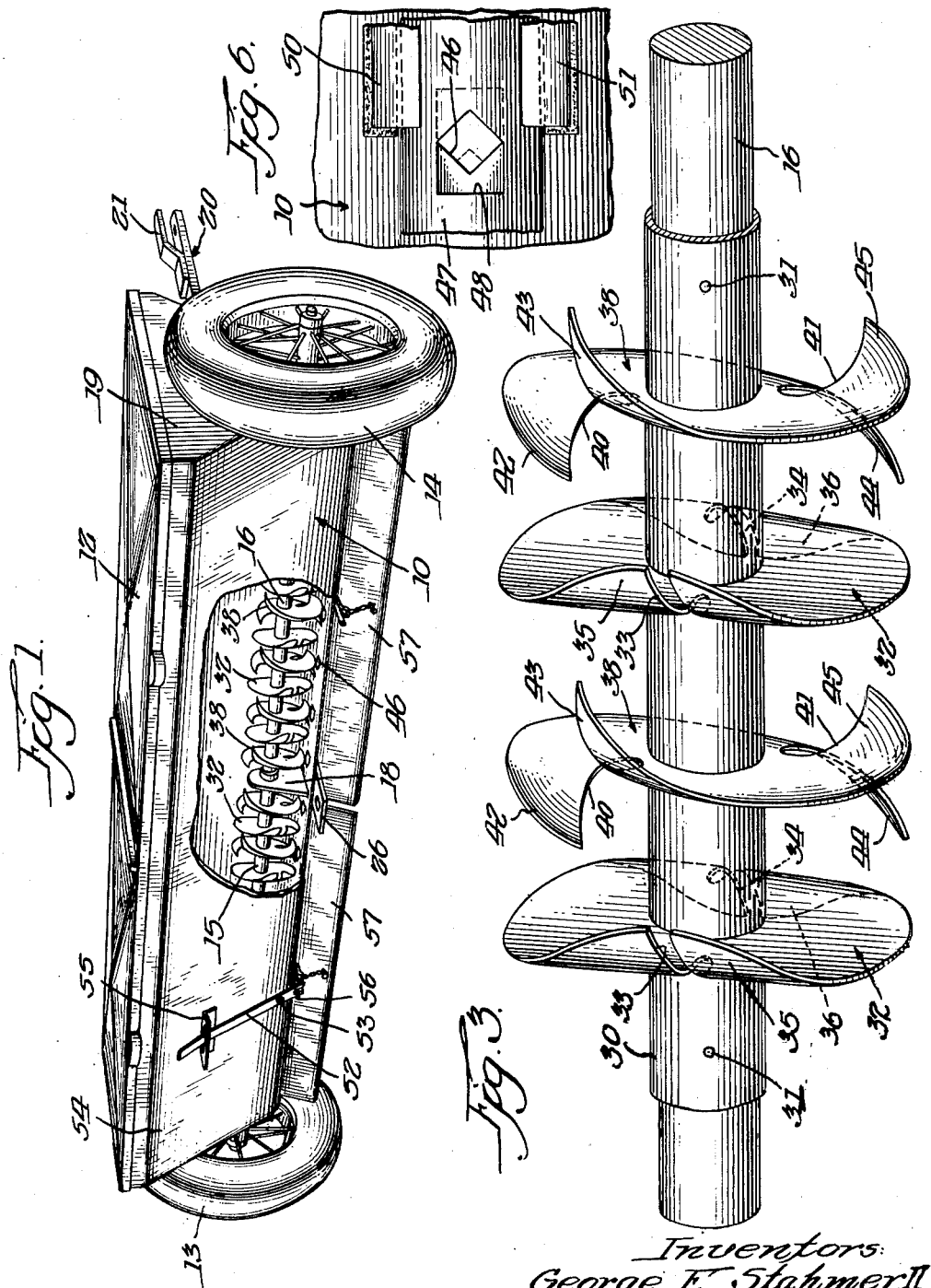
Inventors:
George F. Stahmer II
Russell W. Foley
By Wilkinson Huxley Byron & Knight
Attys.

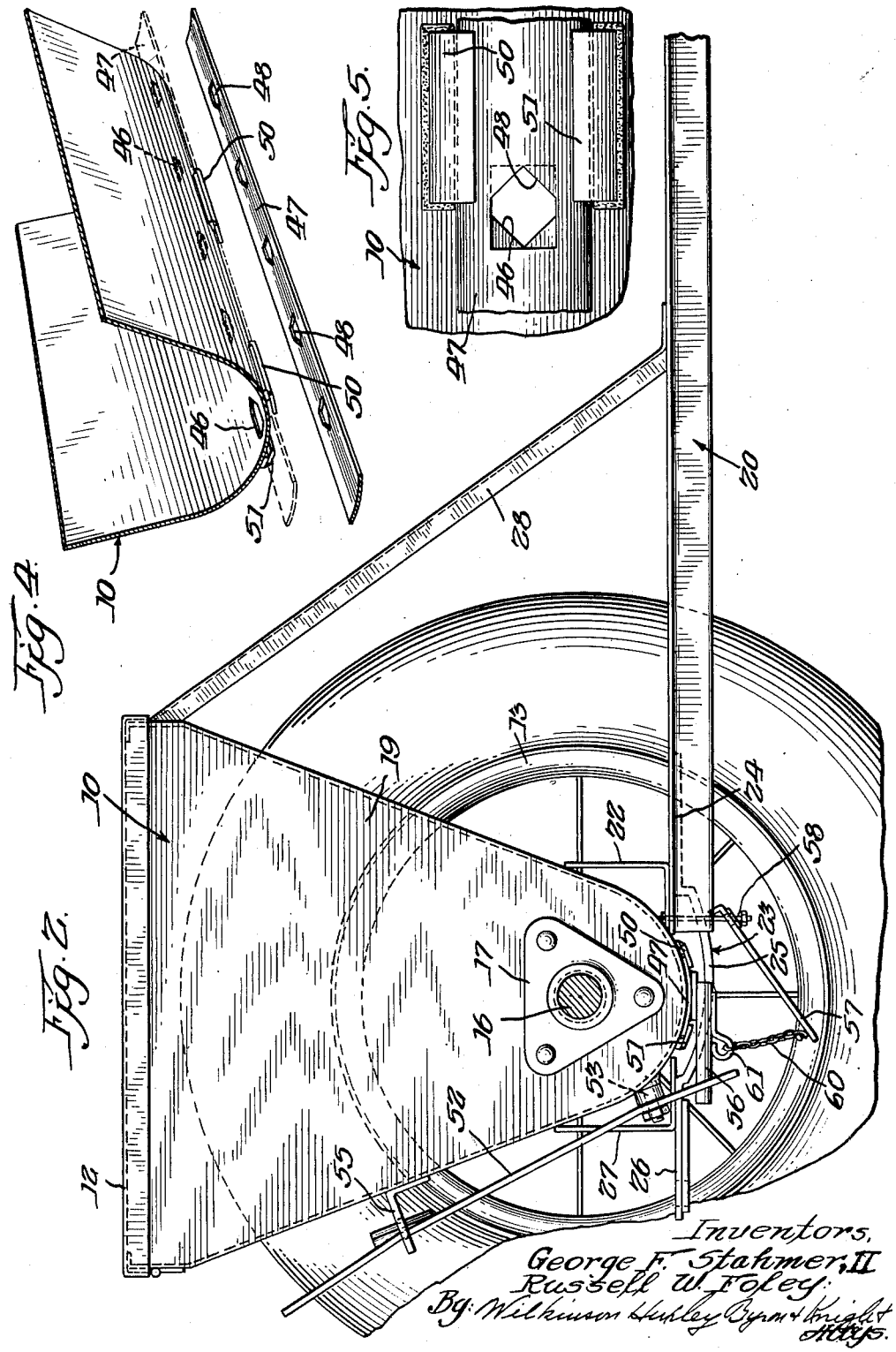

Patented Feb. 6, 1951

2,541,008

UNITED STATES PATENT OFFICE 2,541,008

AGITATING AND DISCHARGING DISK STRUCTURE FOR FERTILIZER SPREADERS

George F. Stahmer, II, and Russell W. Foley, Chicago, Ill.

Application June 8, 1946, Serial No. 675,408

7 Claims. (Cl. 222—177)

The invention relates to fertilizer spreaders and has reference in particular to improved devices of this character having novel agitating and feeding members in combination with adjustable hopper openings through which the fertilizer is discharged by the feeding members.

An object of the invention is to provide a fertilizer spreader of improved construction and which can be adjusted for delivering quantities of fertilizer to suit all possible requirements.

Another object is to provide a fertilizer spreader having an arrangement of agitating members and feeding members which will operate in a manner to positively insure a uniform discharge of material from the hopper openings.

Another object of the invention is to provide a fertilizer spreader including a hopper type container having a novel arrangement of adjustable openings through which the material is discharged.

With these and other objects in view the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 1 is a perspective view of the fertilizer spreader of the invention with parts of the hopper broken away to show the agitating and feeding members;

Figure 2 is an end elevational view of the fertilizer spreader of Figure 1 with the operating shaft being shown in section;

Figure 3 is an enlarged perspective view of a portion of the operating shaft and showing in particular the agitating and feeding members;

Figure 4 is a fragmentary perspective view of the hopper illustrating in detail the constructional arrangement of the adjustable hopper openings; and Figures 5 and 6 are plan views looking up from under the hopper and showing the variable openings resulting from adjustment of the shutter member.

Referring to Figure 1, which illustrates a preferred embodiment of the spreader, the numeral 10 indicates a hopper type container of considerable length and which is approximately V-shaped in cross section with the bottom being somewhat arcuate to accommodate the curvature of the agitating and feeding members to be presently described. The open top of the container 10 is closed by a lid 12 suitably pivoted to the container and capable of being opened for filling the container with fertilizer or other material to be distributed by the device.

The hopper or container 10 is carried by the wheels 13 and 14 which are fixed to shafts respectively journalled by the hopper structure. The wheel 13 is fixed to the extending end of the shaft 15 which is journalled by an end plate, not shown, at the left end of the hopper, Figure 1, and wheel 14 is fixed to shaft 16 journalled by the end plate 17, Figure 2, at the right end of the hopper. Both shafts extend longitudinally of the hopper and are additionally journalled at their inner adjacent ends by the center bearing member 18 located centrally within the hopper and being suitably secured to the bottom of the same. Since both shafts, namely, 15 and 16, are independent of each other the same and thus the wheels 13 and 14 may rotate independently and thus the need for differential mechanism to permit the device to turn corners is eliminated. Since the wheels are caused to rotate as the device is moved, the shafts rotate, and in accordance with the invention they function as operating shafts to rotate the agitating and feeding members on the shafts.

The unitary structure including the hopper 10, the wheels 13 and 14, and their respective shafts 15 and 16, is fixedly secured to a main tongue 20, Figures 1 and 2, by means of which the fertilizer spreader may be secured to a tractor or the like for operation. The tongue 20 is provided with the clevis connection 21 and the opposite end of the tongue is secured to the hopper by the angle members 22. In effect the tongue is continued beyond the hopper by the extension or brace 23 suitably secured at 24 to the tongue and which has an arcuate section 25 located directly below the hopper bottom. The end 26 of the brace 23 is likewise secured to the hopper 10 by the angle member 27 and the entire structure is additionally braced and strengthened by the tie rods 28 which connect respectively with the hopper adjacent the top of the same and with the tongue.

The shafts 15 and 16 are each provided with alternating agitating and feeding members in the form of discs each having a special shape for its particular function. The discs are suitably secured to a sleeve 30 as best shown in Figure 3 and which sleeve is mounted on its respective shaft and pinned thereto by the pins 31. The agitating discs 32 are slotted at 33 and 34, the slots being diametrically opposed and extending from the periphery of the disc to a point adjacent the sleeve. The portion of the disc on both sides of slot 33 is bent toward the right, Figure 3, and the same is thus sufficiently out of the plane of the disc to form an agitating portion or blade 35. In a similar manner each disc 32 in the vicinity of slot 34 is bent in a direction toward the left, Figure 3, forming an agitating blade 36. The agitating discs are spaced longitudinally of their respective shafts and they alternate with feeding discs which will now be described.

The feeding discs are identified by numeral 38 and each has a diameter substantially conforming to that of the discs 32. Also the feeding discs are slotted diametrically as at 40 and 41 with the slots extending inwardly from the periphery and being displaced approximately 90 degrees with respect to the slots 33 and 34 in the agitating discs. Referring to slot 40, it will be seen that adjacent portions of the disc are oppositely bent forming extensions or blades 42 and 43 and in a similar manner the adjacent portions, as regards slot 41, are likewise bent to form blades 44 and 45 identical in curvature and which have the same function as regards feeding as the blades or extensions 42 and 43.

During operation of the device the discs rotate and the agitating members function as wobble plates to constantly agitate the material in the hopper, causing the same to move longitudinally back and forth. This to and fro movement of the loose granular material assures an adequate quantity for the feeding discs which operate on the same in a manner to force or compress the material in a downward direction, with the result that uniform and constant discharge takes place through the hopper openings 46. In Figure 3 the discs may be considered as rotating clockwise and the action of the extensions or feeding blades 42—43 and 44—45 is to promote a downward flow of the material toward an opening 46 which in accordance with the invention is located below a feeding disc 38.

As best shown in Figure 4, the openings 46 in the hopper are pentagonal in shape, having one pointed end and which is directed toward the right, as clearly shown in the section of hopper shown in Figure 4. In accordance with the invention the openings 46 are controlled by the shutter member 47 which is provided with openings 48 also of pentagonal shape, having one pointed end but which is directed toward the left. In other words, the pentagonal shaped openings 48 are similar to 46 but the same are disposed oppositely to the openings in the hopper. The shutter member 47 consists of a metal strip slightly arcuate in cross section so as to conform to the undersurface of the hopper 10. The said shutter 47 is suitably retained in position exteriorly of the hopper 10 and adjacent the curved bottom of the hopper by means of securing strips 50 and 51 which are suitably fixed as by welding to the undersurface of the hopper 10. The strips provide a flange portion which is spaced from the hopper bottom for receiving the shutter 47 and thus the shutter is retained in position, the construction permitting reciprocating movement of the shutter to vary the position of openings 48 with respect to 46. As the shutter 47 is moved in a direction toward the right, Figure 5, a position is reached wherein the discharge openings in the hopper are maximum in size, substantially as shown in said figure, and which is of approximately hexagonal shape. As the shutter 47 is moved to the left, Figure 6, the openings in the hopper become smaller in size as will be clear from said figure, wherein it will be seen that the discharge opening approximates a square. Further movement of the shutter 47 in a direction to decrease the size of the openings in the hopper will result in the square opening becoming smaller and smaller, as indicated by dotted lines in Figure 6. However, in all adjusted positions of the shutter 47 the shape of the discharge opening is either square or hexagonal as described.

A shutter member such as 47 is associated with both half sections of the hopper, or, in other words, a shutter member is associated with the openings under the feeding discs fixed to shaft 15 and a separate shutter member is associated with those openings under the feeding discs fixed to shaft 16. Each half section of the hopper for discharging purposes may be adjusted independently of the other section, and for effecting such movement a lever 52 is provided which is pivotally secured to stud 53 projecting from the rear wall 54 of the hopper. The upper end of lever 52 is associated with bracket 55 and which functions to retain the lever in adjusted position. The lower end of lever 52 is bifurcated and the arms thus provided straddle the finger 56, which, as shown in Figure 2, is suitably secured to its respective shutter member 47. The shutter 47 is supported in contact with the bottom surface of the hopper by the securing strips 50 and 51 which permit reciprocating movement of the shutter member to vary the size of the hopper openings as described. Actuation of lever 52 will oscillate the end of the lever below pivot 53 and which oscillating movement is imparted to finger 56 to produce reciprocating movement of shutter 47.

The material discharging from openings in the hopper is caused to impinge upon the spread board 57, provided for the purpose, and which has the function of spreading and thus distributing the stream of material discharged thereon from an opening in the hopper. One or more spread boards 57 may be provided as shown and which are suitably retained in position under the hopper by means of the depending bolt 58 which is carried by the end of the tongue 20 adjacent the hopper, the same passing through the spread board which is thus secured in a loose manner by said depending bolt. The angular position of the spread board may be adjusted by the chain 60 which is fastened at one end by the eye 61 to finger 56 and which has adjustable connection at its opposite end to the spread board.

In operation of the present fertilizer spreader the same is suitably connected by means of clevis 21 on tongue 20 to a tractor or other source of power and upon movement of the apparatus the wheels 13 and 14 rotate to impart the desired rotation to the agitating discs 32 and to the feeding discs 38. Since shaft 15 is separate from shaft 16 the need for differential mechanism is eliminated. An adjusting lever 52 is provided for each shutter member and by actuation of said lever the desired adjustment as regards the size of the hopper openings can be secured. Each hopper opening, whether maximum or minimum in size, is located substantially directly below a feeding disc and which disc is equipped with a novel arrangement of extensions or blades functioning as the feeding disc rotates to force the loose granular material through its respective hopper opening in a constant and uniform stream of maximum size for the particular opening. The action of the feeding discs is facilitated by the agitating discs which have specially bent peripheral portions for maintaining the material in the hopper adjacent the feeding discs in constant to and fro motion.

It is within the purview of the invention to employ elliptical discs for the agitating and feeding members. Discs of slightly elliptical shape are desired since certain peripheral portions of each disc are bent and as a result of this formation the overall length of the disc along this diameter would be otherwise reduced as regards the length of the disc on a diameter at right angles thereto. This feature of the invention may be embodied in actual structure such as shown in Figure 3 by using agitating members which have their longest diameter substantially coinciding with slots 33 and 34 and by using feeding members having their longest diameter substantially coinciding with the slots 40 and 41. Since portions of each disc adjacent the slots respectively are bent, the net effect is that the resulting discs are substantially circular as regards their effective circumference.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a fertilizer spreader, in combination, a hopper-type container equipped with wheels supporting the container for movement, an operating shaft journalled by the container and extending from at least one end wall of the container, one of said wheels being fixed to the extending end of said operating shaft whereby the shaft is rotated as the wheel is caused to rotate upon movement of the container, a plurality of agitating discs fixed to the operating shaft within the container in spaced relation longitudinally thereof, said discs each having oppositely bent peripheral portions whereby they function as wobble plates to agitate material within the container, a plurality of feeding discs also fixed to the operating shaft within the container and which alternate with the agitating discs, each said feeding disc having feeding blades bent from peripheral portions of the disc and which function to promote movement of material within the container in a downward direction, and said container having a discharge opening in its bottom wall directly below each feeding disc.

2. In a fertilizer spreader as defined by claim 1 wherein each feeding disc is provided with diametrically aligned slots extending inwardly from the periphery of the disc, and wherein the feeding blades are formed by oppositely bending portions of the disc adjacent each slot.

3. In a fertilizer spreader as defined by claim 1, wherein each feeding disc is provided with diametrically aligned slots extending inwardly from the periphery of the disc, wherein the feeding blades are formed by oppositely bending portions of the disc adjacent each slot, and wherein said discharge openings are substantially hexagonal in shape at maximum size changing to a square at intermediate size and which decreases in area until the discharge opening is closed.

4. In a fertilizer spreader, in combination, an elongated hopper type container, operating shafts journalled by the container independently of each other and extending respectively from each end wall of the container, a wheel fixed to the extending end of each operating shaft whereby the container is capable of movement upon rotation of the wheels and which effects rotation of the operating shafts, agitating discs fixed to each operating shaft within the container in spaced relation longitudinally thereof, feeding discs also fixed to each operating shaft within the container and which alternate with the agitating discs on each shaft, said container having pentagonal shaped openings in the bottom wall thereof in alignment with and directly below each feeding disc, means for regulating the size of said openings including a shutter member adjustably carried by the container and having pentagonal shaped openings disposed oppositely to those in the container, said agitating discs each being provided with oppositely bent peripheral portions so that the discs function as wobble plates to agitate the material within the container, and said feeding discs each being provided with blades bent from peripheral portions of the disc whereby they function to promote movement of the material within the container in a downward direction.

5. In a fertilizer spreader, in combination, an elongated hopper type container substantially V-shaped in cross section, operating shafts extending in aligned relation longitudinally of the container being journalled thereby with each shaft extending respectively from an end wall of the container, a wheel fixed to the extending end of each operating shaft whereby the container is capable of movement upon rotation of the wheels and which effects rotation of the operating shafts, a plurality of agitating discs fixed to each operating shaft within the container in spaced relation longitudinally thereof, said discs each having oppositely bent peripheral portions whereby they function as wobble plates to agitate material within the container, a plurality of feeding discs also fixed to each operating shaft within the container and which alternate with the agitating discs, each said feeding disc having diametrically aligned slots extending inwardly from the periphery of the disc, and feeding blades on each disc formed by oppositely bent portions of the same adjacent each slot whereby the feeding discs function to promote movement of material within the container in a downward direction, and said container having adjustable discharge openings in its bottom wall with an opening being located directly below each feeding disc.

6. In a fertilizer spreader, in combination, a container having a bottom wall of substantially arcuate form, an operating shaft journalled by the container in associated relation with the bottom wall and adapted to be rotated, a plurality of discs fixed to the shaft in spaced relation longitudinally thereof, said discs being approximately uniform in diameter and each disc having a pair of diametrically aligned slots forming a blade portion on each side of each slot, certain discs having both blade portions of one slot deflected in the same direction and which is opposite to the deflection of the blade portions of the other slot in the disc, whereby said discs form wobble plates to agitate material in the container, and certain other discs comprising feeding discs for promoting movement of material within the container in a downward direction, said feeding discs having feeding blades formed by oppositely bending the blade portions of each slot in the disc.

7. A fertilizer spreader as defined by claim 6 wherein the wobble plates alternate with the feeding discs longitudinally of the operating shaft, and wherein the slots in the wobble plates are angularly displaced approximately ninety degrees with respect to the slots in the feeding discs.

GEORGE F. STAHMER, II.
RUSSELL W. FOLEY.

REFERENCES CITED

The following references are of record in the file of this patent:

UNITED STATES PATENTS

| Number | Name | Date |
|---|---|---|
| 93,368 | Thomas et al. | Aug. 3, 1869 |
| 808,799 | Woolman | Jan. 2, 1906 |
| 1,177,391 | Davis | Mar. 28, 1916 |
| 1,573,493 | Heyd | Feb. 16, 1926 |
| 1,829,627 | Bambord et al. | Oct. 27, 1931 |
| 1,840,602 | Pender | Jan. 12, 1932 |
| 2,180,253 | Moore | Nov. 14, 1939 |
| 2,302,526 | Card | Nov. 17, 1942 |
| 2,374,425 | De Weerth | Apr. 24, 1945 |